Figure 1:
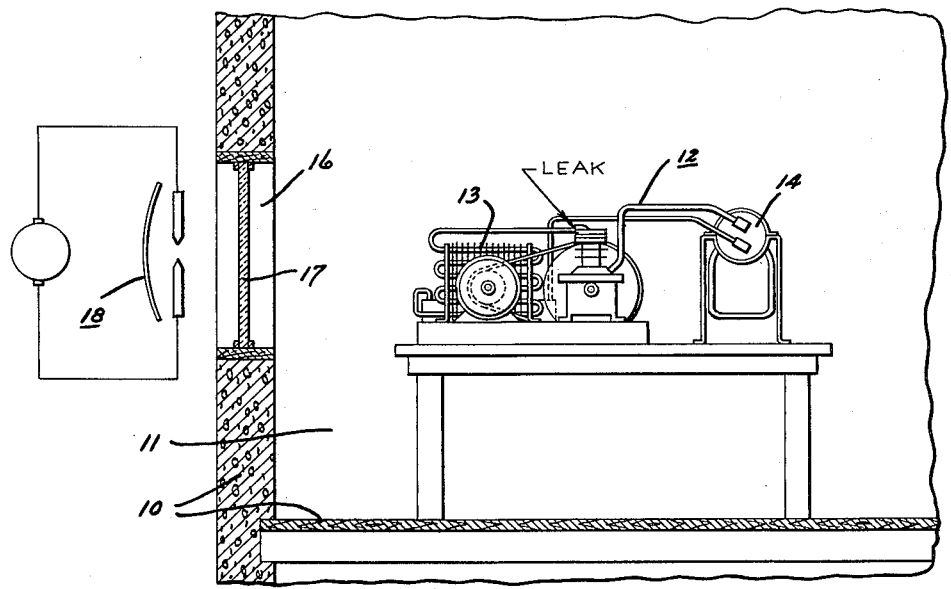

Oct. 19, 1937.   R. S. GAUGLER   2,096,099

METHOD OF DETECTING LEAKS IN REFRIGERATING SYSTEMS

Filed Aug. 16, 1935

INVENTOR.
RICHARD S. GAUGLER.

BY
Spencer, Hardman and Fahr.
HIS ATTORNEYS.

UNITED STATES PATENT OFFICE 2,096,099

METHOD OF DETECTING LEAKS IN REFRIGERATING SYSTEMS

Richard S. Gaugler, Dayton, Ohio, assignor to General Motors Corporation, Dayton, Ohio, a corporation of Delaware Application August 16, 1935, Serial No. 36,550

9 Claims. (Cl. 73—51)

This invention relates to a method of detecting leaks in refrigerating systems.

Heretofore it has been a tedious and difficult task to test a closed refrigerating system, or parts of such system, and particularly systems containing refrigerating mediums of the halo-fluoro derivatives of aliphatic hydrocarbons such for example, as $CCl_2F_2$, $CHClF_2$ and $CHCl_2F$ in order to detect leakage of the refrigerant from the system. One process or method heretofore carried out to detect leakage of refrigerant from a refrigerating system has been to move a tube connected to a lamp or burner leak detecting device, of the type shown and described in my copending applications Serial No. 726,423 filed May 18, 1934 and Serial No. 733,937 filed July 5, 1934, along the pipe lines or adjacent certain elements of or joints in a sealed refrigerating system whereby any refrigerant leaking from the system will be drawn through the tube and into the combustible mixture of the leak detector. The halogens in the escaping refrigerant react with certain elements of the leak detector and causes the detector to emit a bluish-green light indicating the presence of halogens or halogen derivatives. Obviously this is a difficult process of testing a refrigerating system or elements thereof for leaks and requires a considerable amount of time. My invention is directed to eliminating the difficulty heretofore encountered in testing refrigerating systems to detect leakage of refrigerant therefrom.

An object of my invention is to provide an improved method of detecting leakage of refrigerant from a closed refrigerating system or from elements employed therein.

In carrying out the foregoing object it is a further object of my invention to provide a method of detecting leakage of refrigerant from a refrigerating system or from elements employed in the construction of such system which will reduce the time required for the testing operation to a minimum and which will be efficient and effective.

Further objects and advantages of the present invention will be apparent from the following description, reference being had to the accompanying drawing, wherein a preferred form of the present invention is clearly shown.

Figure 2:
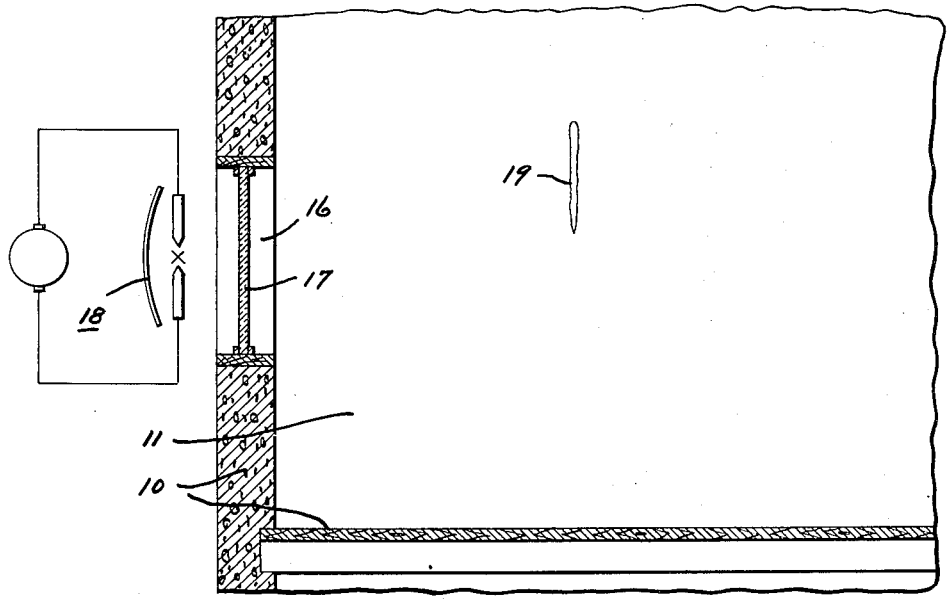

In the drawing:

Fig. 1 is a fragmentary sectional view representing a room having a sealed or closed refrigerating system disposed therein; and Fig. 2 is a view similar to Fig. 1 but shows the room as being darkened and adapted to receive invisible rays from an ultra-violet lamp for detecting leakage of refrigerant from the refrigerating system.

Referring to the drawing and particularly to Fig. 1 there is shown a plurality of any suitably constructed walls 10 defining a room 11. A refrigerating system generally designated by the reference character 12 comprises a refrigerant liquefying and circulating unit of the conventional type and generally represented by the reference character 13. The system 12 also includes a refrigerant evaporating portion represented by the evaporator or cooling element 14. The evaporator 14 is connected to certain elements of the refrigerating liquefying and circulating unit 13 by pipes or conduits to form a sealed or closed circulating system. After assembling and connecting the various elements or portions of the system 12 in fluid tight communication a volatile refrigerating medium is placed in the system by charging the refrigerant thereinto in any suitable and well-known manner. The system is then sealed to provide a closed volatile refrigerant circulating system adapted to be installed in a refrigerator or the like cabinet. The manufacturer must, however, before installing the system in a cabinet or before shipping the system from the factory, be assured that there are no leaks in the sealed system and for this reason each closed system, or any elements containing a refrigerant to be employed in the system, must be tested for the purpose of determining if there is any leakage of refrigerant from the system. As before stated this testing operation has been a tedious and difficult task and I will hereinafter describe an improved method of carrying out a testing operation for the purpose described.

It is a well known scientific fact that certain substances, particularly organic substances, will luminesce under the influence of ultra-violet light. Organic substances such as petroleum, mineral oil and the resins used in varnish have been found to give a bright yellow luminescence or fluorescence similar to the appearance of the light emitted by a firefly. Animal toe nails, human finger nails and teeth are strongly luminescent under the ultra-violet light. This fact is used to advantage in practicing my invention because I have found that by directing the shorter waves of the spectrum such as the invisible ultra-violet radiation or rays, that is, rays or radiation that are not visible to the naked eye, upon certain organic substances or objects placed in a dark room, in which all visible light has been excluded, the substances or objects will luminesce or fluoresce.

The oil ordinarily contained in a conventional closed refrigerating system or circuit and commingled or mixed with the volatile refrigerant therein will fluoroesce or luminesce upon being exposed in a dark room to invisible rays or radiation of an ultra-violet light directed thereupon. Under such conditions it will be understood that if a refrigerating system be placed in a dark room and exposed to the invisible rays or radiation of an ultra-violet light any point of leakage of refrigerant from the sealed system can be detected by the person conducting the test within the dark room by the fluoroescence of the lubricant or oil escaping with the refrigerant at such point, joint or connection. In order to positively insure that the fluoroescence of the oil is a leak and not merely a spot of oil on a pipe or element of the system the person conducting the test can wipe the oil from the point of fluoroescence and again observe whether or not this point fluoroesces. To render a point of leakage in a refrigerating system or in various elements of the system more prominently detectable I may charge into the system along with the refrigerant, which is ordinarily of low organic character, another substance of highly organic character such for example, as alcohol, propane, benzene or carbondi or bi-sulphide. With the substance of highly organic character commingled or mixed with the refrigerant in the refrigerating system any leak can be readily and easily detected by the fluorescence of a relatively tall column of vapor escaping from the refrigerating system.

Referring again to the drawing for the purpose of illustration, it will be obvious that the walls 10 of room 11 are to be constructed of a material that will not permit light to pass therethrough. The room 11 may have any suitable openings closed by doors for providing access thereto. One wall 10 of room 11 is provided with an opening 16 which is closed by a filter member 17 of a character which necessarily prevents the passage of light therethrough. One known filter member suitable for this purpose and which permits the carrying out of my invention is a glass filter sold by the Corning Glass Works, Corning, N. Y., under the trade name "Corex". Other filters may be found to be equally suitable for use in the present invention and such filters must be of the type that will permit the passage therethrough of certain invisible ultra-violet rays produced by any suitable or conventional so-called ultra-violet lamp, generally represented by the reference character 18, mounted or positioned in the present showing of the invention exteriorly of the room 11 adjacent the filter member 17. The visible rays or radiations of the ultra-violet lamp are of course refracted or absorbed by and prevented from passing through the filter 17. It is to be understood that different filter members 17 may be employed depending entirely upon the characteristics thereof to refract or absorb different wave lengths of the invisible ultra-violet radiation or rays in accordance with the organic characteristics of the substance to be detected. The invisible wave lengths of the ultra-violet radiation passing through a filter member may be varied by changing the filter members or material to permit the detection of various objects or substances which may be of lower or higher organic character than those disclosed for illustrative purposes.

The refrigerating system 12 which has a volatile refrigerant and oil mixed with the refrigerant and sealed therein is placed in the room 11 in the present illustration as shown in Fig. 1 of the drawing to determine if there are any leaks in the system. The room 11 is darkened by extinguishing the illuminating light or lights therein. The ultra-violet lamp 18 is illuminated and the filter member 17 prevents the passage of all visible rays emitted from the lamp 18 into the the room 11 while at the same time permitting certain invisible ultra-violet rays or radiation to pass therethrough and to be directed upon the refrigerating system. If there are no leaks in the sealed refrigerating system no fluorescence can be observed in the dark room. Should there be a leak in the sealed refrigerating system the oil surrounding the joint, connection or point of leakage will be caused to fluoresce by the directing of the invisible ultra-violet radiation from the lamp 18 thereon. If one of the highly organic substances of the character herein disclosed are present in or mixed with the refrigerant leaking from the sealed or closed system, a column of vapor such, for example, as indicated by the reference character 19 in the illustration shown in Fig. 2 of the drawing, will fluoresce. Obviously the column of fluorescent vapor renders the point of leakage more readily detectable but one familiar with the design, character, etc., of the refrigerating system and elements thereof is aware of the localities or joints in the system where leaks are most likely to occur and the fluorescence of oil escaping from the system along with the refrigerant is ordinarily sufficient to permit the operator to quickly detect and determine the point of leakage.

While I have disclosed one form of apparatus for carrying out the invention it is to be understood that the invention can be carried out by forms or arrangements other than that disclosed. While I have illustrated the ultra-violet lamp 18 as being of the carbon arc type it is to be understood that other conventional types of ultra-violet lamps may be employed for accomplishing the objects of my invention.

From the foregoing it will be seen that I have provided an improved method of detecting the point of leakage from a sealed or closed refrigerating system or from individual parts of such system. While I have shown and described my invention as for the purpose of detecting the point of leakage of refrigerant from a refrigerating system it is to be understood that my invention is equally applicable for the detection of leaks in other vessels, tanks, closed systems and the like wherein an organic substance is sealed and which are otherwise difficult to test.

While the form of embodiment of the invention as herein disclosed, constitutes a preferred form, it is to be understood that other forms might be adopted, all coming within the scope of the claims which follow.

What is claimed is as follows:

1. The method of detecting a point of leakage of a fluid from at least a part of a closed refrigerating system adapted to have the fluid sealed therein which comprises, placing the part of the refrigerating system in a room or the like from which all light has been excluded and directing invisible rays of a suitable source of radiation upon the part of the refrigerating system to cause luminescence of the leaking fluid.

2. The method of detecting a point of leakage of a fluid from at least a part of a closed refrigerating system adapted to have the fluid sealed therein which comprises, placing the part of the refrigerating system in a room or the like from which all light has been excluded and directing invisible ultra-violet radiation upon the part of the refrigerating system to cause luminescence of the leaking fluid.

3. The method of detecting a point of leakage of a fluid from at least a part of a closed refrigerating system adapted to have an organic refrigerating fluid sealed therein which comprises, placing the part of the refrigerating system in a room or the like from which all light has been excluded and directing invisible rays of a suitable source of radiation upon the part of the refrigerating system to cause luminescence of the leaking organic fluid.

4. The method of detecting a point of leakage of a fluid from at least a part of a closed refrigerating system adapted to have an organic refrigerating fluid sealed therein which comprises, placing the part of the refrigerating system in a room or the like from which all light has been excluded and directing invisible ultra-violet radiation upon the part of the refrigerating system to cause luminescence of the leaking organic fluid.

5. The method of detecting a point of leakage of a substance from a member adapted to have the substance sealed therein which comprises, placing the member in a room or the like from which all light has been excluded and directing invisible rays of a suitable source of radiation upon the member to cause luminescence of the leaking substance.

6. The method of detecting a point of leakage of a substance from a member adapted to have the substance sealed therein which comprises, placing the member in a room or the like from which all light has been excluded and directing invisible ultra-violet radiation upon the member to cause luminescence of the leaking substance.

7. The method of detecting a point of leakage of a substance from a member adapted to have a volatile organic substance sealed therein which comprises, placing the member in a room or the like from which all light has been excluded and directing invisible rays of a suitable source of radiation upon the member to cause luminescence of the leaking volatile organic substance.

8. The method of detecting a point of leakage of a substance from a member adapted to have a volatile organic substance sealed therein which comprises, placing the member in a room or the like from which all light has been excluded and directing invisible ultra-violet radiation upon the member to cause luminescence of the leaking volatile organic substance.

9. The method of detecting a point of leakage of a substance from a member adapted to have the substance sealed therein which consists in, excluding light from the vicinity of the member and directing invisible rays of a suitable source of radiation upon the member to cause luminescence of the leaking fluid.

RICHARD S. GAUGLER.